United States Patent [19]
Haas et al.

[11] Patent Number: 5,311,346
[45] Date of Patent: May 10, 1994

[54] FIBER-OPTIC TRANSMISSION POLARIZATION-DEPENDENT DISTORTION COMPENSATION

[75] Inventors: Zygmunt Haas, Holmdel; Craig D. Poole, Ocean; Mario A. Santoro, Shrewsbury; Jack H. Winters, Middletown, all of N.J.

[73] Assignee: AT&T Bell Laboratories, Murray Hill, N.J.

[21] Appl. No.: 899,971

[22] Filed: Jun. 17, 1992

[51] Int. Cl.$^5$ .............................. H04B 10/00
[52] U.S. Cl. .................... 359/156; 359/161; 359/173; 250/227.17; 371/20.4
[58] Field of Search ............... 359/156, 161, 173, 192, 359/193, 194, 195; 250/227.14, 227.17; 371/16.5, 20.4

[56] References Cited

U.S. PATENT DOCUMENTS

| | | | |
|---|---|---|---|
| 4,856,093 | 8/1989 | Mohr | 359/192 |
| 4,989,200 | 1/1991 | Olshansky et al. | 359/192 |
| 5,124,828 | 6/1992 | Mahon | 359/192 |
| 5,191,462 | 3/1993 | Gitlin et al. | 359/194 |

FOREIGN PATENT DOCUMENTS

| | | | |
|---|---|---|---|
| 0142020 | 10/1984 | European Pat. Off. | H04B 10/18 |
| 0412543 | 8/1989 | European Pat. Off. | |
| 0387870 | 3/1990 | European Pat. Off. | |

OTHER PUBLICATIONS

"Polarization-Dispersion Limitations in Lightwave Systems"; Technical digest, Optical fiber Communications Conference, New Orleans, La., Jan. 25–28, 1988, p. 37 by R. E. Wagner et al.
"Polarization-Dependent Pulse Compression and Broadening Due to Polarization Dispersion in Dispersion-Shifted Fiber", Optics Letters, vol. 13, Feb. 1988, pp. 155–157 by C. D. Poole and C. R. Giles.
"Fading in Lightwave Systems Due to Polarization-Mode Dispersion", IEEE Photonics Technology Letters, vol. 3, Jan. 1991, pp. 68–70 by C. D. Poole et al.
"Proposal for a Fiber-Optic Endlessly Rotatable Fractional Wave Device and its Applications to Lightwave Technologies", Electronics and Communications in Japan Part 2, vol. 71, No. 6, 1988, pp. 36–47 by T. Matsumoto, et al.

*Primary Examiner*—Richard E. Chilcot, Jr.
*Assistant Examiner*—K. Negash
*Attorney, Agent, or Firm*—Eli Weiss

[57] ABSTRACT

The polarization-dependent distortion of an optical signal transmitted through an optical fiber is reduced by aligning the polarization of the optical signal to minimize the received signal distortion. A polarization controller (a device which can change the polarization of light in an optical fiber) may be located at either the input or output end of a long haul optical fiber system and is used to align the polarization of the signal to minimize the received signal distortion. Automatic operation of the polarization controller can be obtained by using a steepest-descent method based on a distortion measure of the received signal for the optical signal transmitted through the optical fiber to generate control signals which are used to control the polarization controller.

14 Claims, 2 Drawing Sheets

FIBER-OPTIC TRANSMISSION POLARIZATION-DEPENDENT DISTORTION COMPENSATION

TECHNICAL FIELD

This invention relates to lightwave transmission systems. More particularly, this invention relates to apparatus for minimizing polarization dependent distortion in high speed long haul terrestrial and undersea lightwave systems, as well as analog lightwave systems.

BACKGROUND OF THE INVENTION

Many factors in lightwave communication systems make the optical signal propagation polarization dependent. These factors include polarization-dependent loss and polarization mode dispersion in the fiber and the system components.

For example, consider polarization mode dispersion (PMD). The core of an optical fiber is not truly symmetrical, and therefore the propagation of an optical signal at one polarization, for example, vertical, will be different than the propagation of the optical signal at another polarization, for example, horizontal. With no polarization-dependent loss, for each frequency there exist a pair of orthogonal input states of polarization for which the corresponding output states of polarization are orthogonal and are independent of wavelength to the first order. These states are referred to as the principle states of polarization (PSP) in the fiber. With sufficiently narrow bandwidth, such as with external modulation of a single-frequency laser, optical signals transmitted in either of these two states are undistorted at the receiver, but have, in general, different time delays. A signal with arbitrary polarization can be expressed in terms of a sum of signals in each PSP, and thus will be received as two signals with different delays. The received signal is therefore distorted unless it is transmitted with one of the two PSPs.

If the PSPs of the fiber remained constant, then one-time corrective measures could be taken when a system is installed to avoid its adverse effects. However, the PSPs as well as the time delay changes with time. Factors that cause the PSPs and delay to change with time include changes in temperature caused by, e.g., sunlight and ocean currents. In addition, any change of position or movement of the optical fiber will cause a change of PSPs and also a change in the time delays. Thus, for a given input polarization the received signal distortion varies with time.

With large PMD, or with wider bandwidth signals, such as with direct laser modulation, or with polarization-dependent loss, the signal propagation may no longer be adequately described by the PSP model. However, the distortion of the received signal is still polarization dependent. Furthermore, since, for a given input state of polarization, the state of polarization of the optical signal in the fiber changes with time, the distortion of the received signal also changes with time, even when the distortion is due to components whose polarization-dependent properties are constant.

It is recognized that if the polarization-dependent distortion of an optical pulse signal traversing an optical fiber can be minimized, then the bit rate with which, and/or distance over which, information can be transmitted over a fiber optic transmission channel can be increased.

SUMMARY OF THE INVENTION

In accordance with the present invention, it is recognized that the foregoing problem can be solved by utilizing, in the fiber optic transmission context, a technique for aligning the polarization of an optical signal being transmitted via an optical fiber to the input state of polarization with minimum received signal distortion or by receiving only the output state of polarization with minimum signal distortion.

In preferred embodiments of the invention, more particularly, a polarization controller, a device which can change the polarization of light in an optical fiber, is coupled to correct the polarization of light as it either enters or leaves a long haul terrestrial or undersea optical fiber. Using a gradient search algorithm based on a measure of the distortion of the received signal that was transmitted over the optical fiber, control signals are generated for controlling the polarization controller to substantially reduce polarization dependent distortion.

DETAILED DESCRIPTION

Figure 1:
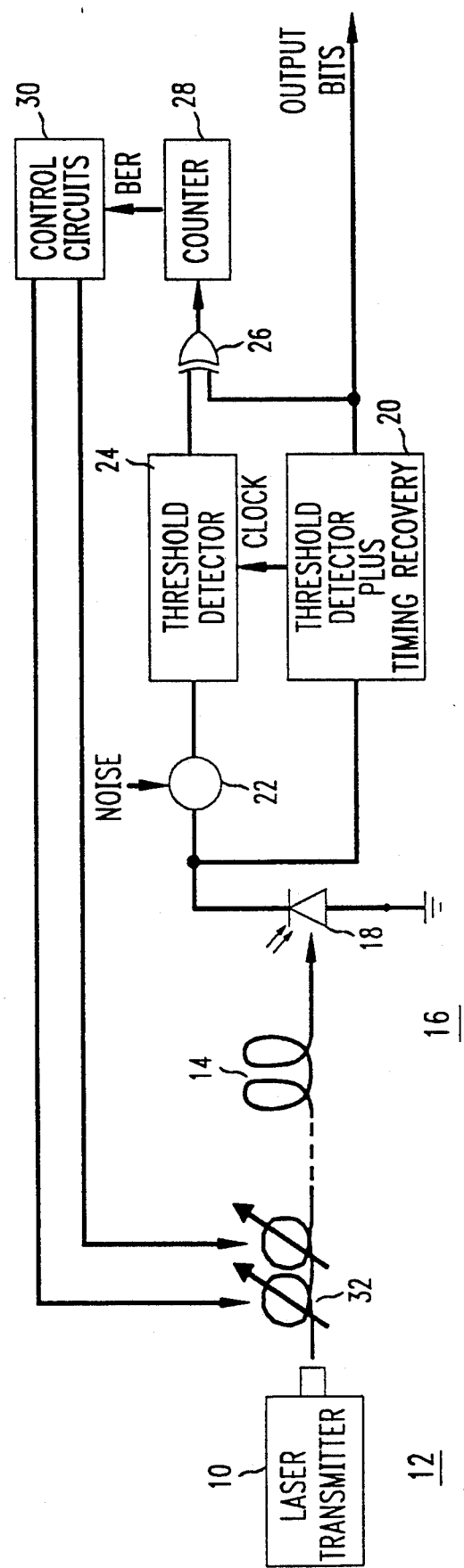
FIG. 1 is a block diagram of a fiber optic transmission system embodying the principles of the invention by changing the polarization of the optical signal entering the optical fiber to the state of polarization with minimum distortion.

Polarization-dependent distortion is a significant factor which can limit the maximum bit rate-distance in high speed, long haul terrestrial and undersea lightwave systems. The source of this distortion includes polarization-dependent loss and polarization mode dispersion. It can cause significant signal degradation of the optical signal at data rates of 2.5 Gbps and above in optical amplifier systems.

Let us first consider polarization mode dispersion. The effect of polarization mode dispersion (PMD) in coherent and direct detection lightwave systems, including first order frequency effects along with higher order effects have been studied and the results were presented in various publications such as "Polarization-Dispersion Limitations in Lightwave Systems" in Technical Digest, Optical Fiber Communications Conference, New Orleans, La., Jan. 25-28, 1988, p. 93 by R. E. Wagner et al.; "Polarization-Dependent Pulse Compression and Broadening Due to Polarization Dispersion in Dispersion-Shifted Fiber", Optics Letters, Vol. 13, February 1988, pp. 155-157 by C. D. Poole, et al.; and "Fading in Lightwave Systems Due to Polarization-Mode Dispersion", IEEE Photonics Technology Letters, Vol. 3, January 1991, pp. 68-70 by C. D. Poole et al.

Experimental results have shown that the first order effects dominate with external modulation of the transmitting laser or with FSK modulation. First order effects of polarization mode dispersion arise because of a differential delay time of components of a wave aligned with two orthogonal principal states of polarization of a fiber. In this instance, PMD is a linear distortion in the received electrical signal.

In a single mode optical fiber, it has been shown that for each frequency there exists a pair of orthogonal input and corresponding output states of polarization, referred to as principle states of polarization (PSPs). Signals transmitted in either of these two states have no first order PMD, but the signals in the two states have, in general, different time delays. Thus, a signal transmitted through an optical fiber with arbitrary polarization can be described mathematically using these PSPs as basic functions. From this mathematical relationship it was concluded by the inventors that the first order PMD can be avoided if the transmit (or receive) polarization is aligned to one of the PSPs of the fiber. With wider bandwidth signals, such as with direct laser modulation, or with polarization-dependent loss, the signal propagation may no longer be adequately described by the PSP model. However, the distortion of the received signal is still polarization dependent, and performance can be improved by aligning the input polarization to the polarization with minimum signal distortion. Thus, even with these polarization-dependent impairments, the received signal distortion can be reduced by proper adjustment of the transmit or receive polarization. Therefore, by adjusting the polarization, the maximum bit rate and/or distance of a given optical fiber system can be increased. Note that since the propagation characteristics of the fiber are continuously changing, this adjustment must be continuous or at least often repeated.

Referring to FIG. 1, there is illustrated an embodiment of the invention for aligning the polarization of light into an optical fiber to one of the PSPs using an optical polarization controller at the input end of the optical fiber. Specifically, a laser transmitter 10 is coupled to transmit an optical signal from a first station 12 via a long optical fiber 14 to a second station 16. At the second station, an optical to electrical detector 18 detects the optical signal from the optical fiber 14 and converts it into an electrical signal. The signal from the detector is directed to a threshold detector and timing recovery circuit 20. The threshold detector samples each received symbol of the received signal to determine if it is a "1" or a "0", and the timing recovery circuit establishes timing signals which are used to determine the instant when the received signal is to be sampled. The output signal of the threshold detector is a stream of well defined "0s" and "1s", and this signal is the electrical equivalent of the transmitted optical signals. To determine how to adjust the polarization controller, a measure of the performance of the receiver is required. In the embodiment shown in FIG. 1, the bit error rate (BER) is used as the performance measure. Since it is usually desirable to have the receiver output error-free, though, a second detector with added noise is used to generate errored data, with the BER corresponding to the level of distortion. As shown in FIG. 1, the signal from the detector 18 is also combined with noise at 22, and the resultant signal is directed to a threshold detector 24. Thus, the signal from detector 24, because of the added noise, has relatively high error rate compared to the signal from the detector 20. The two signals are directed to an exclusive OR gate 26 where the relatively error free signal from detector 20 is compared with the relatively high error rate signal from detector 24. The output signal from the gate 26 is directed to a counter 28 where the bit error rate (BER) is determined.

The BER signal from the counter 28 is directed to a control circuit 30 which performs a gradient search as described in detail in the book, "Digital Communications" by John C. Proakis, pp. 369 published by McGraw-Hill Book Company in 1983.

Specifically, the control circuitry 30 generates a signal to rotate the polarization controller 32 output signal polarization in the direction that reduces the BER. The polarization controller 32 is located at the input of the optical fiber 14 and can be a Oshima Computer programmable polarization controller as described in the publication "Proposal for a Fiber-Optic Endlessly Rotatable Fractional Wave Device and Its Application to Lightwave Technologies" in Electronics and Communications in Japan, Part 2, Vol. 71, No. 6, 1988, pp. 36–47, by T. Matsumoto et al. This device consists of two fiber loops that are rotated to operate like quarter-wave and half-wave plates. The output polarization is determined by the settings of the two plates, i.e., the polarization can be described by two parameters.

The gradient descent technique works as follows. The BER with the polarization controller at the initial setting is measured. The control circuitry then changes the setting of one plate of the controller by a small amount and notes the change in the BER. If the BER decreases, the setting was changed in the right direction. If, however, the BER increases, the setting is adjusted by twice that amount in the opposite direction so that the setting has now been changed in the right direction from the initial position. This process is repeated for the other plate, and the entire process is continuously repeated to find and track the polarization with minimum distortion.

The gradient search method can be visualized by examining the BER surface. The plot of the BER versus the two settings that determine the polarization, where the first setting can be along the X axis, the second setting can be along the Y axis and the BER is along the Z axis is a three dimensional BER surface. With PMD and external modulation, this surface has only two local minima, one at each PSP, which for small PMD, have equal BER. Thus, the gradient search method locates and tracks one of the PSP's. With high PMD, wide bandwidth signals, or polarization-dependent loss, the local minima may no longer be equal, but in all cases the gradient search method will still locate and track a minima which reduces distortion.

Although a polarization controller at the transmitter is adequate for most systems, consideration should be given to the feedback requirements. For example, information must be transmitted from the receiver back to the transmitter. In addition, for long transmission distance where polarization-dependent distortion is a problem, the delay in the feedback due to propagation delay may make tracking the PSPs difficult if the PSP's change too rapidly.

These problems can be overcome by transmitting the optical signal from the laser transmitter to the long haul optical fiber with fixed polarization and locating the polarization controller at the receiving end of the optical fiber 14 which is located at the second station 16.

Figure 2:
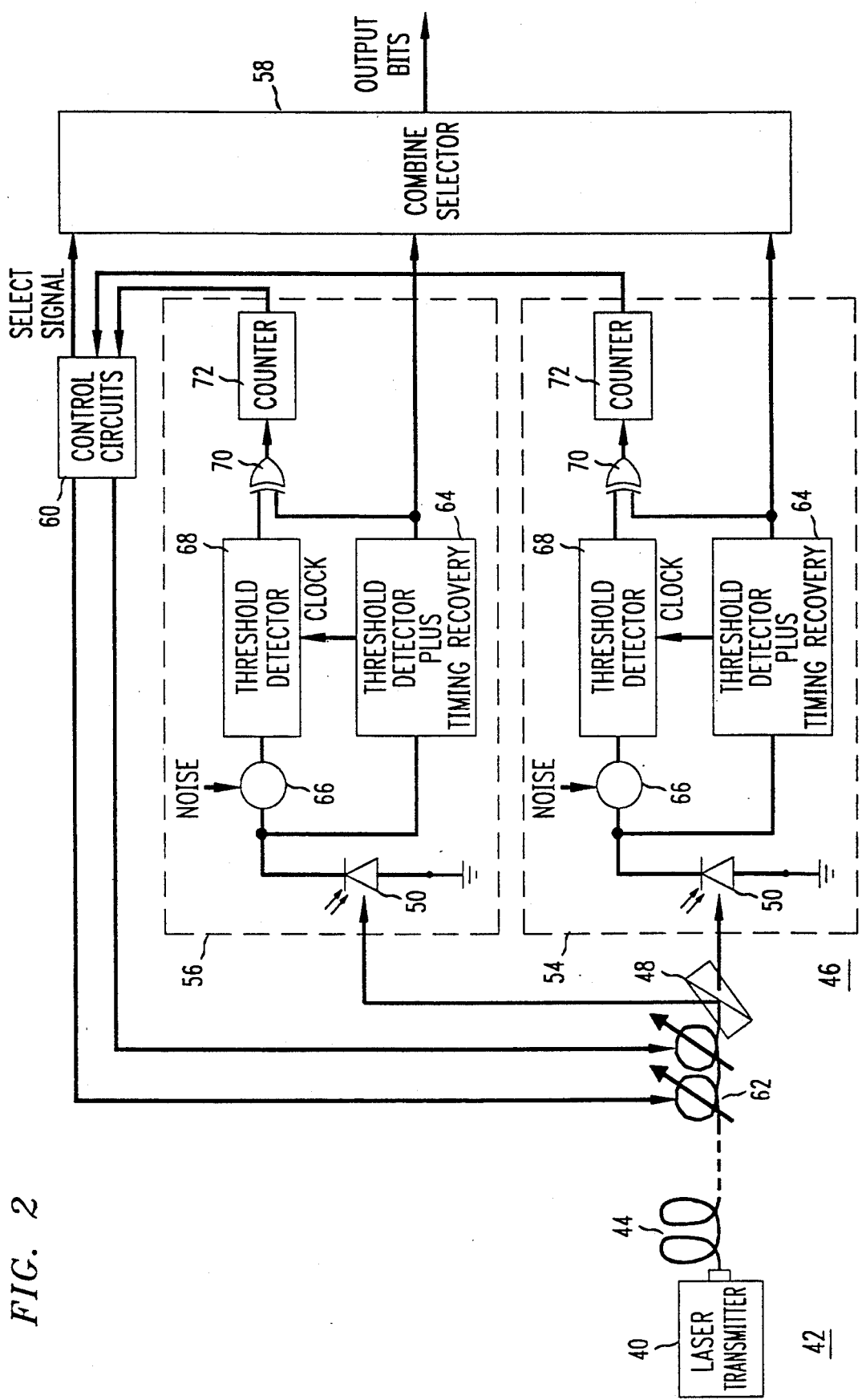
FIG. 2 is a block diagram of a fiber optic transmission system embodying the principles of the invention by changing the polarization of the optical signal exiting the optical fiber so that signals in orthogonal states of polarization with minimum distortion are detected separately.

Referring to FIG. 2, there is illustrated a block diagram of a fiber optic transmission system embodying the principles of the invention by changing the polarization of optical signal such that signals in the two PSP's are detected separately.

In FIG. 2, a laser transmitter 40 is coupled to transmit an optical signal from a first station 42 via a long haul terrestrial or undersea optical fiber 44 to a second station 46. At the second station, the received optical signal has its polarization rotated such that signals in the PSP's of the fiber are separated by a polarization splitter 48 which divides the received optical signal into two signals polarized at 90° to each other. The two orthogonally polarized signals are directed toward separate detectors 50, 52 which convert the received optical signals into electrical signals. The electrical signal from detector 50 is directed to a first receiver 54; and the electrical signal from detector 52 is directed to a second receiver 56. The outputs of the two receivers are directed to a combiner-selector 58, and to a control circuit 60. The output signals from the control circuit 60 are directed to polarization controller 62. It is to be noted that, in FIG. 2, the polarization controller is located at the output of the optical fiber 44 and, as described in FIG. 1, the polarization controller can be an Oshima Computer programmable polarization controller.

Referring to receiver 54, the signal from the detector 50 is directed to threshold detector and timing recovery circuit 64 which samples each received electrical symbol to determine whether it is a "1" or a "0". The output signal of the threshold detector is a series of "1s" and "0s" which is the electrical equivalent of the optical symbols transmitted over the optical fiber 44. The electrical signal from the detector 50 is also combined with noise at 66, and the resultant signal is directed to a threshold detector 68. The signal at the output port of the threshold detector has a relatively small BER while the signal from detector 68, because the added noise has a relatively high BER. The two signals, one from threshold detector 64 and the other from threshold detector 68, are directed to the input ports of an exclusive OR gate 70 which compares the two signals. The output signal from the exclusive OR gate 70 is directed to a counter 72 which determines the actual BER.

The receiver 56 is similar in all respects to the receiver 52 and, therefore, to avoid repetition, a recitation of the connections between the various components is not given again. However, as the various components and the functions of the various components of receiver 56 are similar to those of receiver 54, the reference numerals used to identify the components of receiver 54 are repeated for the similar components of receiver 56.

The output signals from the counters 72 of receivers 54, 56 are directed to the control circuit 60 which, as noted previously, generates control signals that adjust the setting of polarization controller 62.

In operation, a signal from the first station 42 via optical fiber 44 to second station 46 is split at polarization splitter 48 into two beams, one of which is directed toward detector 50 and the other of which is directed toward detector 52. Referring to receiver 54, the detector 50 detects the received optical signal from polarization splitter 48 and converts it into an electrical signal. This signal is directed to a threshold detector and timing recovery circuit 64 and, after being combined with noise at 66, to threshold detector 68. The threshold detectors sample each received symbol and determines if it is a "1" or a "0". In addition, threshold detector 64 generates clock signals which are required for timing purposes and forwards these signals to the threshold detector 68. The signal from detector 64 which has a relatively low BER and the signal from detector 68 which has a relatively high BER are directed to the two input ports of exclusive OR gate 70. It is noted that the relatively high BER of the signal from detector 68 is due primarily to the added noise. The output signal from the exclusive OR gate 70 is directed to counter 72 which generates a signal which represents the bit error rate.

Referring to receiver 56, the signal from the polarization splitter 48 which is received by detector 52 is converted into an electrical signal which is directed to the two threshold detectors 64, 68 of receiver 56. As noted previously, the operation of receiver 56 is similar to that of receiver 54.

The BER signals from counters 72 of receivers 54, 56 are directed to control circuit 60. The control circuit 60 examines the BER signals from receivers 54, 56 and determines at some instant of time which signal has the lower BER.

Note that with PMD, the two receivers will generally have different BER's because the power received in each polarization will differ. In addition, higher order effects of PMD can also make the BER of the two PSP's differ. Thus, control circuitry in using the gradient search method uses the lower BER in determining the adjustment of the polarization controllers as described before. In addition, the control circuitry also selects the output from the receiver with the lower BER as the output bits. For example, if the BER from counter 72 in receiver 56 is lower than that from counter 72 in receiver 54, control circuitry 60 would generate a select signal which causes combine/selector 58 to output the bit from detector 64 in receiver 56.

Although the above implementation is the preferred embodiment, there are many variations for the invention. For example, in FIG. 1, the second threshold detector can be avoided when forward error correction coding is used since the BER before correction can be used as the performance measure, with the corrected output bits nearly error-free. Other performance measures, such as signal-to-noise ratio, and received signal eye opening in either the vertical (amplitude) or horizontal (time) direction, can be used. Other techniques to determine the polarization controller adjustment can also be used. With the performance measures of signal-to-noise ratio or eye opening, gradient ascent, rather than descent, can be used to maximize these performance measures. Also, the performance measure (e.g., BER) surface can be periodically scanned and the controller setting located at that setting with the optimum performance.

For the receive polarization controller of FIG. 2, the selector can be replaced by a combiner that weights, and/or delays, and then sums the two signals output from the photodetectors 50 in receiver 54 and 56 to minimize distortion, followed by threshold detection to determine the output bits.

Finally, the invention is not limited to digital optical communications systems. Since analog cable TV systems using optical fibers with subcarrier multiplexing can also suffer polarization-dependent distortion, the invention is also useful in these systems.

It will thus be appreciated that those skilled in the art will be able to devise numerous arrangements which, although not explicitly shown or described herein, embody the principles of the invention. Accordingly, all such alternatives, modifications and variations which fall within the spirit and broad scope of the appended claims will be embraced by the principles of the invention.

We claim:

1. Apparatus for use in a system in which at least one information bearing optical signal is transmitted over an optical fiber having transmission properties that are polarization-dependent, said apparatus comprising detecting means for receiving and converting the information bearing optical signal from the optical fiber into electrical signals, means, coupled to said detecting means, for receiving said electrical signals and determining and generating a signal that corresponds to polarization-dependent distortion in the optical signal from said optical fiber, means, for receiving said distortion signal to generate a control signal, and means, controlled by said control signal, for adjusting the polarization of the optical signal in the optical fiber to minimize the polarization-dependent distortion of the received optical signal.

2. The apparatus of claim 1 wherein said means for adjusting the polarization of the optical signal to minimize the distortion of the received optical signal comprises a polarization controller.

3. The apparatus of claim 2 wherein said polarization controller is operatively coupled to a transmitting end of the optical fiber.

4. The apparatus of claim 3 wherein said means for determining and generating a signal that corresponds to the distortion in the optical signal from said optical fiber comprises a first threshold detector coupled to receive the signal from said detecting means, a source of noise, a second threshold detector coupled to receive the signal from said detecting means and the noise from said source of noise gate means coupled to compare the signals from said first threshold detector with the signals from said second threshold detector, and means coupled to the output of said gate means to generate an error signal.

5. The apparatus of claim 4 wherein
said gate means comprises an exclusive OR gate.

6. The apparatus of claim 5 wherein
said error signal generating means comprises a counter.

7. The apparatus of claim 2 wherein said control signal generating means uses a gradient search method to generate control signals that incrementally drives the polarization controller to set the polarization of the optical signal to minimize the signal distortion.

8. The apparatus of claim 2 wherein said polarization controller is operatively coupled to a receiving end of the optical fiber.

9. The apparatus of claim 8 wherein said
detecting means comprises a polarization splitter to divide the received optical signal into a first and a second signal where said first and second signals are polarized at 90° to each other, and said means for determining and generating an error rate signal comprises first and second receivers said first receiver comprises a first threshold detector coupled to receive said first signal from said detecting means, a source of noise, a second threshold detector coupled to receive said first signal and the noise from said source of noise, first gate means coupled to compare the signals from said first threshold detector with the signals from said second threshold detector, and first means coupled to the output of said gate means to generate a first error signal;

said second receiver comprises a third threshold detector coupled to receive said second signal from said detecting means, a fourth threshold detector coupled to receive said second signal and the noise from said source of noise, second gate means coupled to compare the signals from said third threshold detector with the signals from said fourth threshold detector, and second means coupled to the output of said gate means to generate a second error signal.

10. The apparatus of claim 9 wherein said control signal generating means selects the error signal from said first and second error signals which has the lower number of errors and uses a gradient search method to generate control signals that incrementally drives the polarization controller to set the polarization of the optical signal to one of the principal states of polarization of the optical fiber.

11. The apparatus of claim 10 wherein
each of said first and second gate means comprises an exclusive OR gate.

12. The apparatus of claim 10 further comprising
selector means coupled to said first and third threshold detectors and to said control signal generating means to provide an output signal representative of the signal transmitted on the optical fiber.

13. The apparatus of claim 12 wherein
said selector means selects the signal from one of said first and third threshold detectors as the output signal.

14. The apparatus of claim 13 wherein
said selector means
selects the signals from said first and third threshold detectors as the output signal.

* * * * *